(12) United States Patent
Zambelli

(10) Patent No.: US 6,784,578 B2
(45) Date of Patent: Aug. 31, 2004

(54) SELF-ENERGIZING BRAKE (75) Inventor: Robert Gene Zambelli, Souderton, PA (US)

(73) Assignee: Moog Components Group Inc., East Aurora, NY (US)

(*) Notice: Subject to any disclaimer, the term of this patent is extended or adjusted under 35 U.S.C. 154(b) by 198 days.

(21) Appl. No.: 10/188,058

(22) Filed: Jul. 3, 2002

(65) Prior Publication Data
US 2004/0004406 A1 Jan. 8, 2004

(51) Int. Cl.[7] .................................................. H02K 7/02
(52) U.S. Cl. ........................................ 310/77; 188/171
(58) Field of Search ............................... 310/76, 77, 92, 310/93; 188/156, 157, 158, 166, 171, 187

(56) References Cited

U.S. PATENT DOCUMENTS 4,381,048 A * 4/1983 Haverkamp et al. ........ 188/171
5,306,989 A * 4/1994 Feller, Jr. ..................... 318/372
5,932,944 A    8/1999 Ko .............................. 310/77
5,982,063 A   11/1999 Lutz et al. ..................... 310/77
6,376,948 B1   4/2002 Li-Yang ........................ 310/77

* cited by examiner

Primary Examiner—Dang Le
(74) Attorney, Agent, or Firm—Phillips Lytle LLP (57) ABSTRACT A self-energizing brake for a motor has a moving brake section, including a brake friction material located on a portion of a face thereof perpendicular to its axis of rotation which is automatically urged toward a brake mating surface upon the motor coming to a stop, thereby automatically energizing the brake, and which is automatically urged away from the brake mating surface upon the motor beginning its rotation, thereby automatically de-energizing the brake.

17 Claims, 6 Drawing Sheets

SELF-ENERGIZING BRAKE

BACKGROUND OF THE INVENTION

1. Field of the Invention

The present invention relates to an automatic, self-energizing brake and more particularly, to an automatic, self-energizing brake which may be used with a motor, such as an electric motor.

2. Description of the Related Art

A motor driven device often needs a braking mechanism to prevent the movement thereof when the motor is no longer applying torque to the device. For example, an automobile has a parking brake to prevent it from moving when the motor is turned off.

A motor driven device which is driven by an electric motor may also need a braking mechanism to prevent the movement of the device when the motor is de-energized. Unfortunately, such braking mechanisms have tended to be either manual mechanisms which must be operated by a user or automatic mechanisms which have tended to be complicated, expensive, and failure-prone.

U.S. Pat. No. 6,376,948 to Li-Yang discloses a motor-synchronous exciting brake which utilizes the magnetic field generated by the electric motor to disengage a braking mechanism. When current to the electric motor is cut off, the magnetic field generated by the electric motor disappears and the braking mechanism is engaged to prevent the motor shaft from moving. The disclosed braking mechanism, however, is very complicated and must be disposed within the electric motor so as to make use of the magnetic field thereof.

U.S. Pat. No. 5,982,063 to Lutz et al. discloses another electric motor arrangement having an internal braking mechanism. While the disclosed mechanism is simpler than that of Li-Yang noted above, the braking mechanism of Lutz et al. requires the energization of an electromagnet to engage the braking mechanism, thereby requiring either a manual operation or requiring additional circuitry for the braking mechanism.

U.S. Pat. No. 5,932,944 to Ko discloses still another electric motor assembly with a braking mechanism. While the mechanism of this patent does not require the electromagnet of Lutz et al., nor is it internal to the electric motor as in both Li-Yang and Lutz et al., the braking mechanism of Ko is complicated and is integral with a complicated gearbox assembly.

SUMMARY OF THE INVENTION

An aspect of the present invention is to provide an automatic self-energizing brake which may be used with a motor, such as an electric motor.

In an aspect of the present invention, a moving brake section, including a brake friction material located on a portion of a face thereof perpendicular to its axis of rotation is automatically urged toward a brake mating surface upon the motor coming to a stop, thereby automatically energizing the brake, and is automatically urged away from the brake mating surface upon the motor beginning its rotation, thereby automatically de-energizing the brake.

In another aspect of the present invention, a bearing carrier having at least two bearings is arranged to interact with a trough of the moving brake section to urge the moving brake section away from the brake mating surface.

In still another aspect of the present invention, an elastic means, such as a spring, is used to urge the brake moving section toward the brake mating surface.

These and other objects of the present invention may be achieved by providing a self-energizing brake for a motor, the self-energizing brake comprising: a bearing carrier arranged to be mechanically connected to a shaft of the motor; a moving brake section located coaxially with said bearing carrier, said moving brake section including a brake friction material located on a portion of a face thereof perpendicular to said axis of rotation of said bearing carrier; an output torque transmitting means mechanically connected to said moving brake section; a brake mating surface located on said motor and perpendicular to said axis of rotation of said bearing carrier, said brake mating surface initially mating with said brake friction material so as to be in contact therewith upon said shaft of the motor being at rest; an elastic means urging said moving brake section in an axial direction toward said brake mating surface; wherein upon said shaft of said motor rotating, said bearing carrier causes said moving brake section and said brake friction material to move axially away from said brake mating surface, resulting in said brake friction material being spaced apart from said brake mating surface; and wherein upon said shaft of said motor further rotating, said bearing carrier causes a cessation of said axial movement of said moving brake section and said brake friction material; and wherein upon said shaft of said motor ceasing to rotate, said elastic means urging said moving brake section and said brake friction material to move axially toward said brake mating surface until said brake friction material is in contact therewith.

The foregoing and other objects of the present invention may also be achieved by providing a self-energized brake for a motor, the self-energizing brake comprising: a bearing carrier arranged to be mechanically connected to a shaft of the motor, said bearing carrier including at least two bearings, each bearing having an axis of rotation perpendicular to an axis of rotation of said bearing carrier; a moving brake section located coaxially with said bearing carrier, said moving brake section including a trough having at least two trough portions to respectively contain said at least two bearings, said trough portions each including a bearing ramp and a bearing stop for its respective bearing, and said moving brake section further including a brake friction material located on a portion of a face thereof perpendicular to said axis of rotation of said bearing carrier; an output torque transmitting means mechanically connected to said moving brake section; a brake mating surface located on said motor and perpendicular to said axis of rotation of said bearing carrier, said brake mating surface initially mating with said brake friction material so as to be in contact therewith upon said shaft of the motor being at rest; an elastic means and an elastic means retainer and an elastic means retainer fixing means, said elastic means and said elastic means retainer being located coaxially with said bearing carrier, said elastic means retainer fixing means preventing movement of said elastic means retainer in one axial direction and said elastic means urging said moving brake section in an axial direction toward said brake mating surface; and wherein upon said shaft of said motor rotating, said bearing carrier and said at least two bearings rotate until said bearings come in contact with and move up their respective bearing ramps, so as to cause said moving brake section and said brake friction material to move axially away from said brake mating surface, resulting in said brake friction material being spaced apart from said brake mating surface; and wherein upon said shaft of said motor further rotating, said bearing carrier and said at least two bearings further rotating until said bearings come up against their respective bearing stops, resulting in a cessation of said axial movement of said moving brake section and said brake friction material; and wherein upon said shaft of said motor ceasing to rotate, said elastic means urging said moving brake section and said brake friction material to move axially toward said brake mating surface, causing said at least two bearings to move away from their respective bearing stops and to roll down their respective bearing ramps until said brake friction material is again in contact with said brake mating surface.

In the present invention, the output torque transmitting means may include one of a gear or a pulley or sprocket and the elastic means may include a spring and the brake mating surface may include either a face of the motor or a plate located adjacent the motor.

In the present invention, the bearings may include one of a ball bearing or a roller bearing or a bushing and the elastic means retainer may include a washer shaped spring retainer and the elastic means retainer fixing means may include one of a retaining ring or a pin.

In the present invention, the bearing carrier may be mechanically connected to the shaft of the motor by one of set screws, a splined shaft, or a key and a matching keyway.

Lastly, in the present invention, each of the trough portions may have a major axis extending radially in a direction which is perpendicular to the axis of rotation of the bearing carrier and a width of each of the trough portions may increase in a direction away from the axis of rotation of the bearing carrier.

The foregoing and a better understanding of the present invention will become apparent from the following detailed description of an example embodiment and the claims when read in connection with the accompanying drawings, all forming a part of the disclosure of this invention. While the foregoing and following written and illustrated disclosure focuses on disclosing an example embodiment of the Invention, it should be clearly understood that the same is by way of illustration and example only and that the invention is not limited thereto. The spirit and scope of the present invention are limited only by the terms of the appended claims.

BRIEF DESCRIPTION OF THE DRAWINGS

The following represents brief descriptions of the drawings, wherein.

DETAILED DESCRIPTION

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Where specific details have been set forth in order to describe the example embodiment of the present invention, it should be apparent to one skilled in the art that the present invention can be practice without, or with variations of, these specific details. Lastly, although the present invention will be described for use with an electric motor, it is to be understood that the present invention is not limited thereto but rather may be used with any type of motor having a rotating output shaft, such as a magnetic motor, an air driven motor, a piston driven motor, a gasoline engine, etc.

Figure 1:
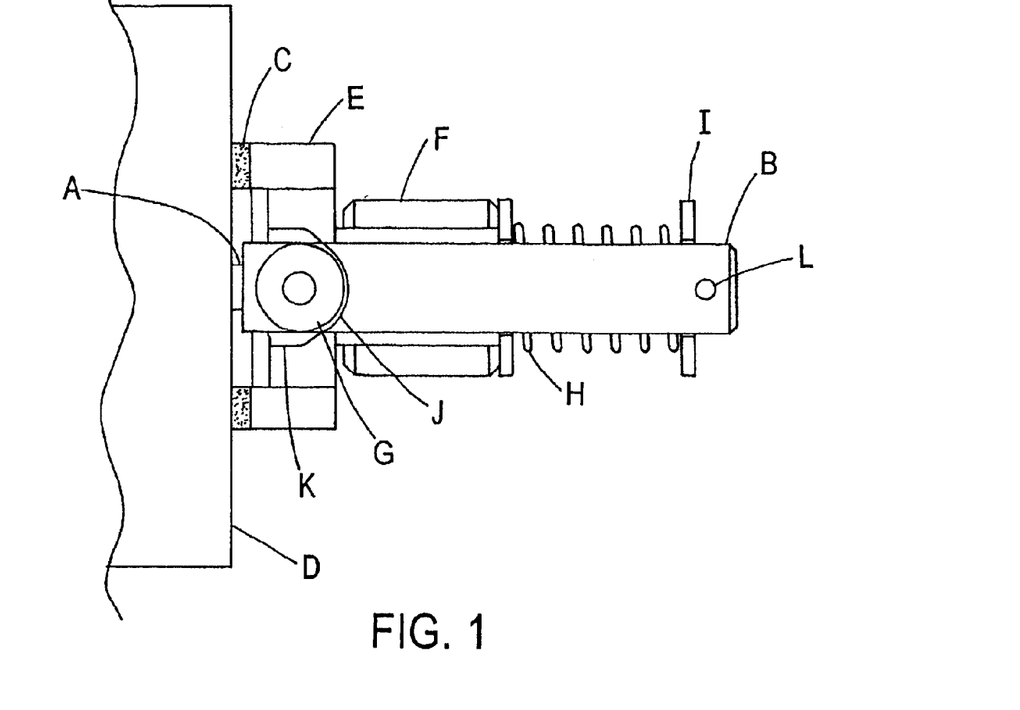
FIG. 1 illustrates a side elevational view of an automatic, self-energizing brake in accordance with an example embodiment of the present invention.
Figure 2:
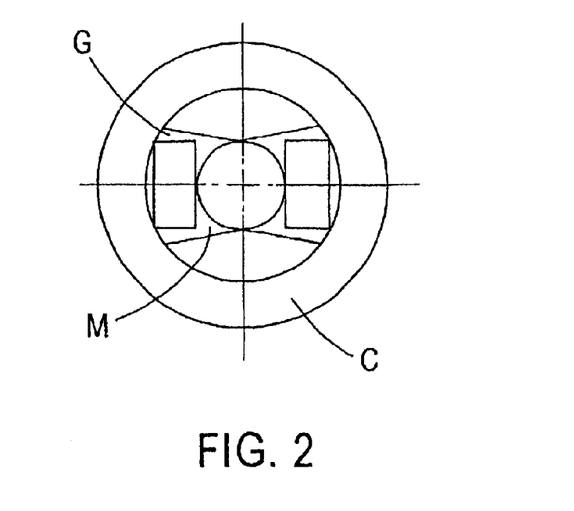
FIG. 2 illustrates an end view of the brake illustrated in FIG. 1.

FIG. 1 illustrates a side elevational view of an automatic, self-energizing brake in accordance with an example embodiment of the present invention and FIG. 2 illustrates an end view of the brake illustrated in FIG. 1. As illustrated therein, a motor shaft A has a bearing carrier B affixed to it. A cylindrical moving section of the brake E is coaxial with the motor shaft A and has an output gear (or pulley or sprocket) F affixed to the moving section E. A mating gear (or drive belt or drive chain) (not shown) is mechanically connected to the output gear (or pulley or sprocket) F to allow the motor to transmit torque to a load (not shown). A compression spring H is located on the bearing carrier B between the output gear F and a spring retainer I. A pin or retaining ring L, for example, is used to secure the spring retainer I.

A brake friction material C is affixed to the end surface of the moving section E and is selectively in contact with the motor frame face D. While not shown, a disk or plate may be a affixed to the motor frame face D such that the brake friction material C is selectively in contact with the disk or plate rather than directly with the motor frame face D. At least two bearings or bushings G have their shafts attached to the bearing carrier B such that the axes of the shafts of the bearings G are perpendicular to the axis of the motor shaft A. The bearings or bushings G may be ball bearings, or roller bearings, or various types of bushings, depending upon the particular application. While only two bearings G are illustrated, the present invention is not limited thereto. The bearings G have their inner races attached to respective shafts attached to the bearing carrier B and their outer races are free to roll on their respective bearing ramps J (to be discussed below).

The bearings G are contained within portions of a trough M located in the moving section E. The illustrated trough M includes a bearing ramp J and a bearing stop K in each trough portion. The number of trough portions is equal to the number of bearings G.

Torque is transmitted from the motor shaft A to the bearing carrier B to the bearings G to the moving section of the brake E to the output gear F. That is, a rotational torque is transmitted from the motor shaft A directly to the bearing carrier B. The bearings G, whose shafts are attached to the bearing carrier B, transmit the torque to the moving section of the brake E via contact with portions of the trough M of the brake moving section E. The torque is then transmitted from the moving section E directly to the output gear F. The torque is then transmitted from the output gear F to the motor load (not shown) via a mating gear (not shown).

Figure 3:
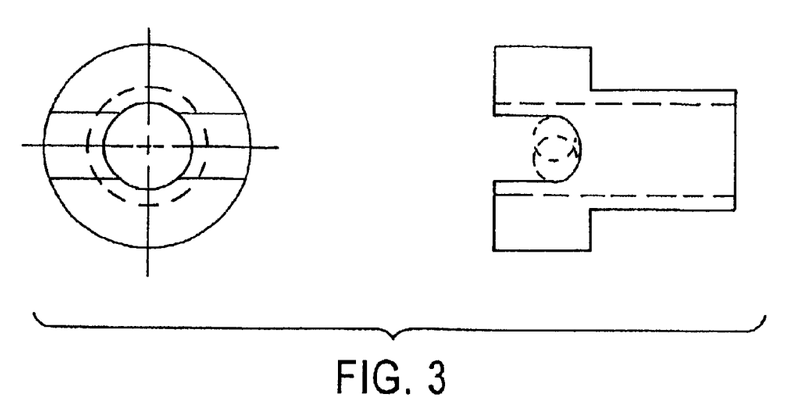
FIGS. 3–5 illustrate side and end views of the steps of an example method of manufacturing the moving section E of the brake in accordance with the example embodiment of the present invention illustrated in FIG. 1.
Figure 4:
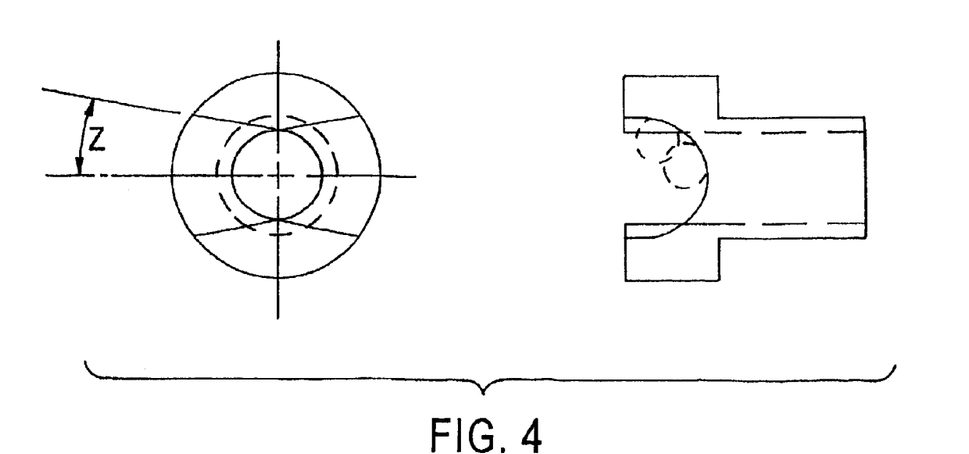
Figure 5:
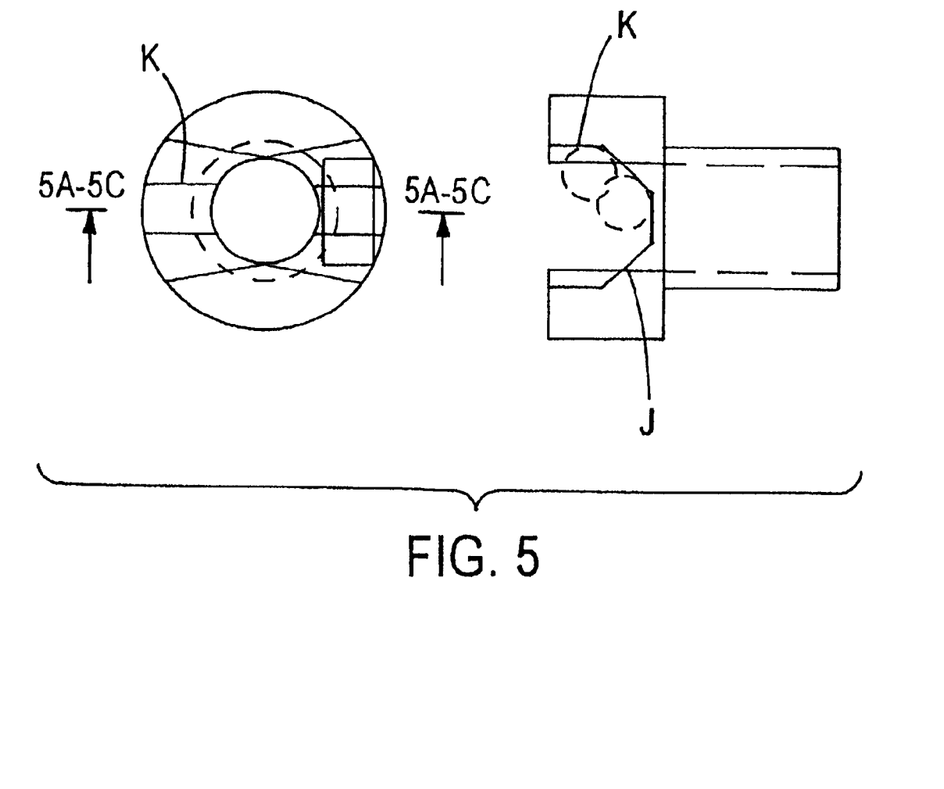
Figure 5A:
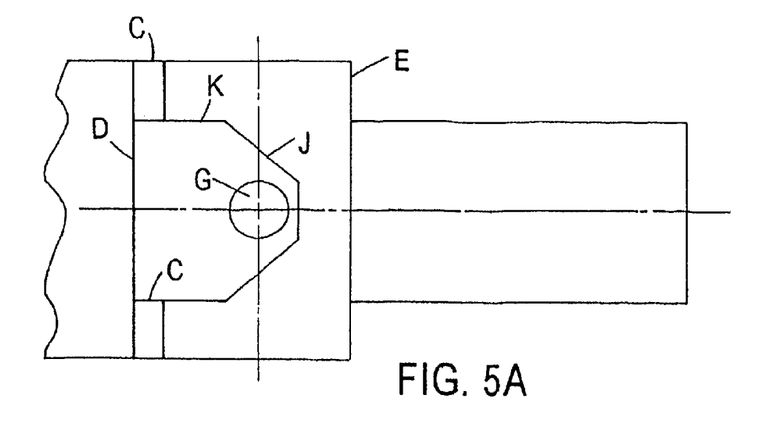
FIGS. 5A–5C illustrate partial side views of the brake illustrated in FIG. 1.
Figure 5B:
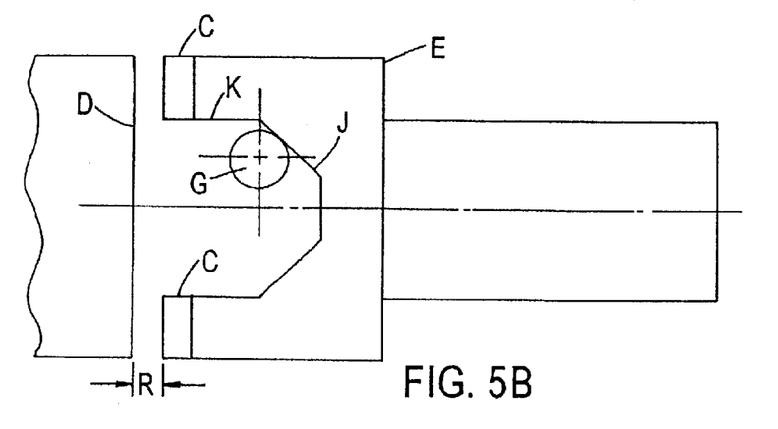
Figure 5C:
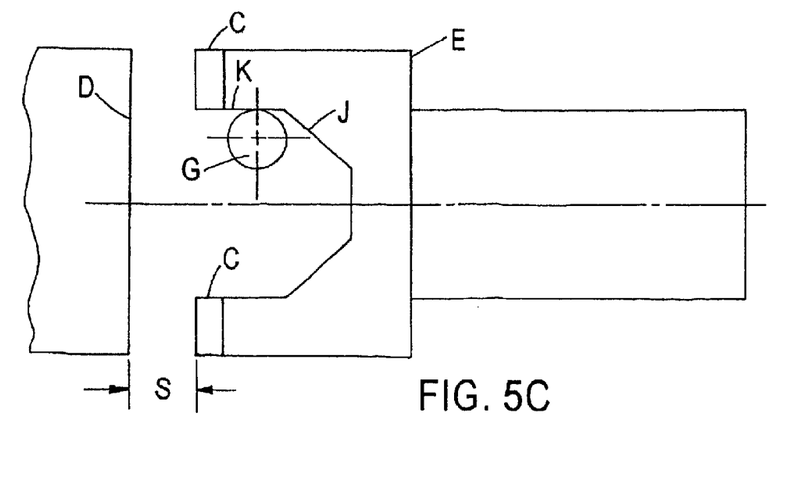
Figure 6:
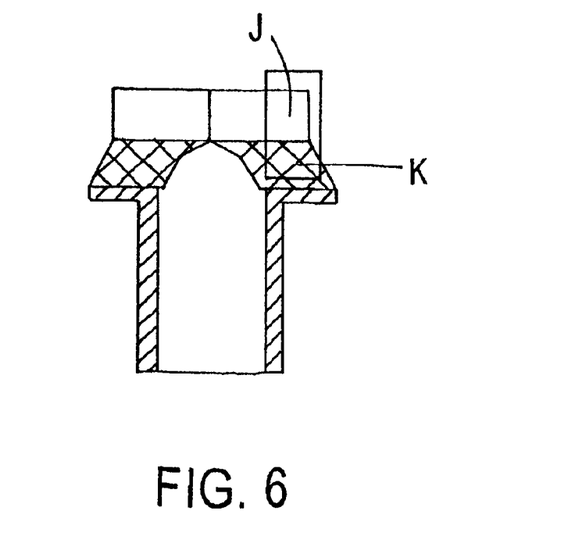
FIG. 6 illustrates a sectional view of the end view of FIG. 5 taken along section A—A in FIG. 5.

FIGS. 3–5 illustrate side and end views of the steps of an example method of manufacturing the moving section E of the brake in accordance with the example embodiment of the present invention illustrated in FIG. 1 and FIG. 6 illustrates a sectional view of the end view of FIG. 5 taken along section A—A. In view of the unusual shape of the trough M, these figures will be used in explaining the shape of the trough M. FIGS. 5A–5C illustrate partial side views of the brake illustrated in FIG. 1.

As shown in FIG. 3, a milling machine cutter, for example, may be used to initially rough out the shape of the trough M. Then, as illustrated in FIG. 4, a milling machine cutter, for example, may also be used to finalize the bowtie shape of the trough M. Note that the angle Z of the trough M portions may be on the order of 10 degrees. FIGS. 5 and 6 show the details of the trough M including the bearing stops K and the bearing ramps J.

The following is a discussion of the operation of the self-energizing brake in accordance with an example embodiment of the present invention, referring to FIGS. 1–6. Initially, when the motor is de-energized, the spring H urges the output gear F and the moving section of the brake E and the brake friction material C to the left as viewed in FIG. 1 such that the brake friction material C is in contact with the motor frame face D so as to prevent the rotation of the moving section of the brake E and the output gear F, thereby preventing rotation of the mating gear and its attached load (not shown).

When the motor is energized, the motor shaft A, the bearing carrier B, and the bearings G rotate through a small angle allowed by the shape of the trough M until the bearings G contact the bearing ramps J of the trough M. The further rotation of the motor causes the bearings G to move up the bearing ramps J, thereby forcing the moving section E, the output gear F and the brake friction material C to move axially to the right as viewed in FIG. 1 so as to cause the brake friction material C to no longer be in contact with the motor frame face D, thereby releasing the brake.

The still further rotation of the motor causes the bearings G to come up against the bearing stops K of the trough M so as to prevent further axial displacement of the moving section E and the output gear F with respect to the motor frame face D. As long as the motor is energized and torque is being transmitted from the motor shaft to a load (not shown) via the output gear F, the bearings G remain up against the bearing stops K so as to keep the brake friction material C away from the motor frame face D, thereby keeping the brake released.

At some point, the motor is de-energized and torque is no longer transmitted to the load. Since the spring H is always urging the moving section E, the output gear F and the brake friction material C in an axial direction toward the motor frame face D, the moving section E, the output gear F and the brake friction material C will move axially toward the motor frame face D, causing the bearings G to no longer be up against the bearing stops K and to roll down the bearing ramps J, thereby causing rotation of the motor shaft A, the bearing carrier B, and bearings G until the brake friction material C is again in contact with the motor frame face D, thereby automatically actuating the brake.

In further detail, referring to FIGS. 5A–5C, initially, as illustrated in FIG. 5A, the brake friction material C is pressed against the motor frame face D by the urging of the spring H (not shown in this figure), thus engaging the brake mechanism. The bearings G are either not in contact with or barely in contact with the moving section E.

As shown in FIG. 5B, upon the motor being energized, the bearings G began to move up the bearing ramps J of the moving section E so as to urge the moving section E to the right in this drawing figure, overcoming the force of the spring H, so that the brake friction material C is separated by a distance R from the motor frame face D, thus disengaging the brake mechanism.

As shown in FIG. 5C, upon further energization of the motor, the bearings G come up against the bearing stops K such that the brake friction material C is separated by a distance S from the motor frame face D.

To summarize, the bearings G interact with the bearing ramps J in a cam like arrangement to urge the moving section E so as to be spaced apart from the motor frame face D upon the motor being energized. There are very few moving parts in the brake mechanism and accordingly, the brake mechanism in accordance with an embodiment of the present invention is low in cost and easy to manufacture and assemble as well as being reliable and resistant to failure.

Figure 7:
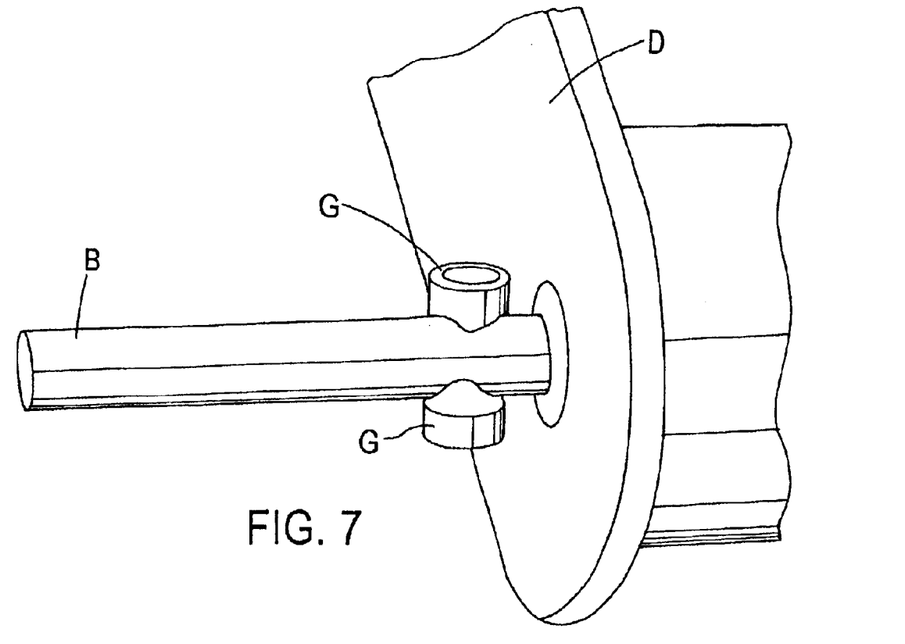
FIG. 7 illustrates the motor shaft A, bearing carrier B, bearings G, and motor frame face D of the example embodiment of the present invention illustrated in FIG. 1.

FIG. 7 illustrates the motor shaft A, bearing carrier B, bearings G, and motor frame face D of the example embodiment of the present invention illustrated in FIG. 1. The bearing carrier B can be affixed to the motor shaft A by any suitable means, such as set screws, a splined shaft, a key and matching keyway, etc., providing that the bearing carrier B is affixed to the motor shaft A such that there is no axial movement there between. The shafts of the bearings G, affixed to the bearings G respective inner races, can be affixed to the bearing carrier B by any suitable means, such as welding, for example, depending upon the particular application.

Figure 8:
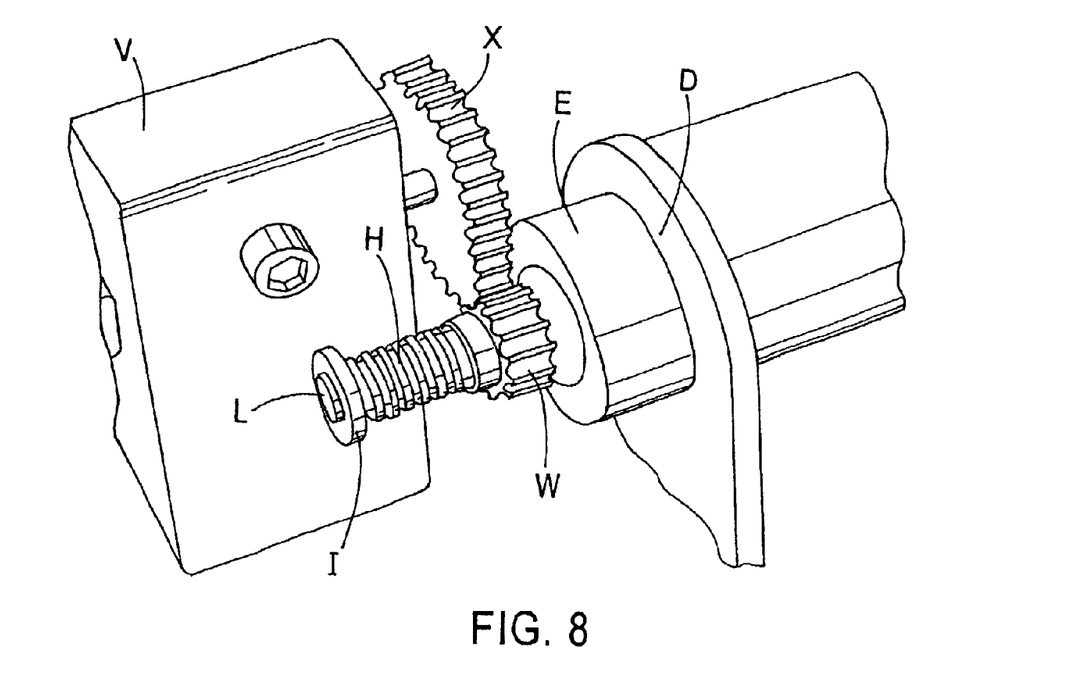
FIG. 8 illustrates the brake illustrated in FIG. 1 attached to a torque fixture for testing purposes.

FIG. 8 illustrates the brake illustrated in FIG. 1 attached to a torque fixture V for testing purposes. Note that in this drawing figure, the torque fixture V, representing a load, is mechanically connected via mating gears W and X rather than via a pulley and mating drive belt or a sprocket and mating drive chain. The choice of gears or pulley/drive belt or sprocket/drive chain arrangement depends upon the particular application.

Figure 9:
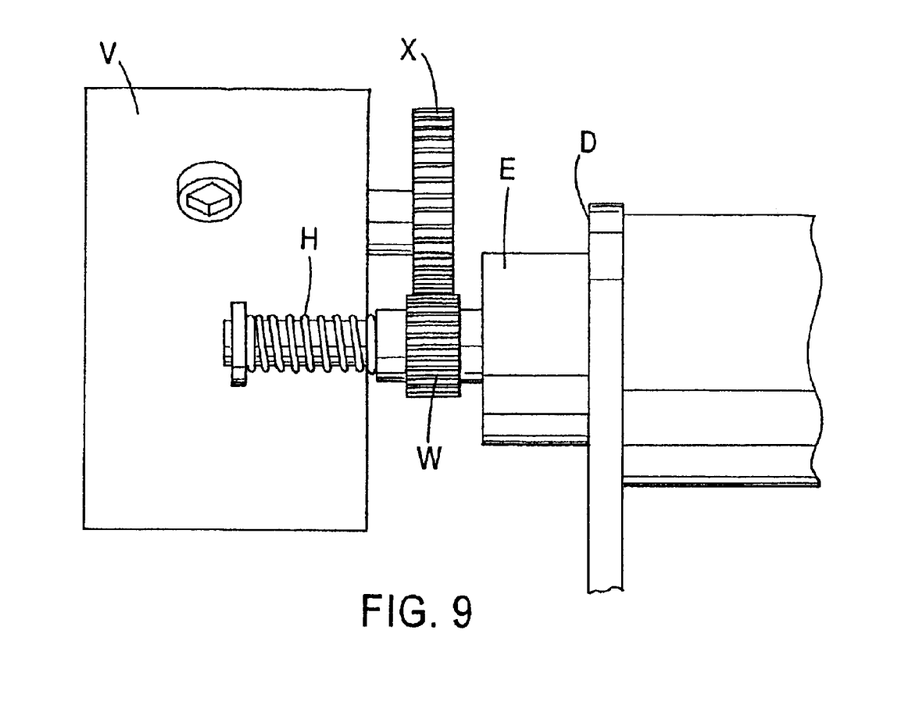
FIG. 9 illustrates the brake illustrated in FIG. 1 upon being engaged.
Figure 10:
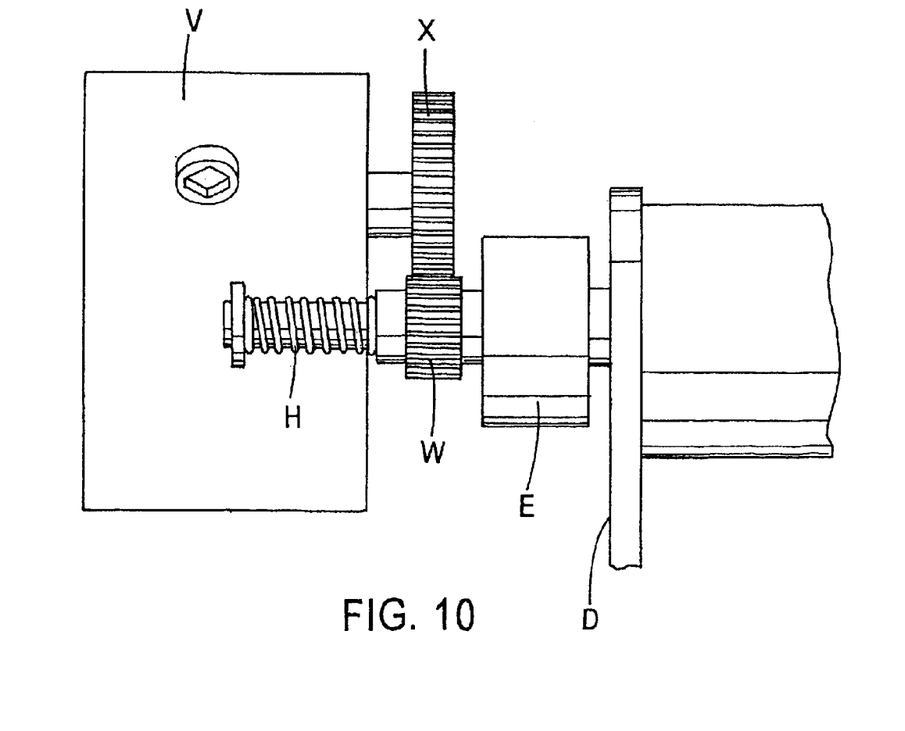
FIG. 10 illustrates the brake illustrated in FIG. 1 upon being disengaged.

FIG. 9 illustrates the brake illustrated in FIG. 1 upon being engaged and FIG. 10 illustrates the brake of the present invention illustrated in FIG. 1 upon being disengaged. As can be seen from these drawing figures, the brake friction material C contacts the motor frame face D when the brake is engaged and is spaced apart from the motor frame face D when the brake is disengaged. Note that the mating gears W and X remain mated whether or not the brake is engaged.

There are three factors which determine the amount of static braking torque that can be developed by the automatic, self-energizing brake in accordance with the present invention. Namely, the force N supplied by the compression spring H, the coefficient of friction m between the brake friction material C and the motor frame face D, and the mean radius r of the braking surface. Accordingly, the braking torque T may be given by the following equation:

$$T = N \times m \times r$$

It is clear from the above-noted equation that the braking torque T can easily be adjusted to fit the particular application by selecting the three above-noted parameters.

Furthermore, irrespective of whether a gear or pulley or sprocket and respective mating gear or drive belt or drive chain is chosen, the combination must be capable of accommodating the slight axial displacement of the brake assembly. Accordingly, bevel gears would be unacceptable for use with this brake assembly.

Still furthermore, it is clear that the combination of the spring force of the compression spring H, the ramp angle of the bearing ramps J, and the load torque will together determine the threshold torque which must be generated by the motor to initiate movement of the brake assembly, thereby releasing the brake. That is, the motor must provide sufficient torque to cause the bearings G to proceed up the bearing ramps J so as to cause a force on the moving section E in an axial direction which is opposite to and greater than the axial spring force of the compression spring H, thereby urging the brake friction material C attached to the moving section E to be spaced apart from the motor frame face D, thereby releasing the brake.

In addition, the drag of the motor must be such that the compression spring H and the combination of the bearings G and the bearing ramps J can cause the motor to rotate a small amount while driving the brake assembly back to its engaged position.

This concludes the description of the example embodiment. Although the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A self-energizing brake for a motor, the self-energizing brake comprising:
   a bearing carrier arranged to be mechanically connected to a shaft of the motor;
   a moving brake section located coaxially with said bearing carrier, said moving brake section including a brake friction material located on a portion of a face thereof perpendicular to said axis of rotation of said bearing carrier;
   an output torque transmitting means mechanically connected to said moving brake section;
   a brake mating surface located on said motor and perpendicular to said axis of rotation of said bearing carrier, said brake mating surface initially mating with said brake friction material so as to be in contact therewith upon said shaft of the motor being at rest;
   an elastic means urging said moving brake section in an axial direction toward said brake mating surface;
   wherein upon said shaft of said motor rotating, said bearing carrier causes said moving brake section and said brake friction material to move axially away from said brake mating surface, resulting in said brake friction material being spaced apart from said brake mating surface; and
   wherein upon said shaft of said motor further rotating, said bearing carrier causes a cessation of said axial movement of said moving brake section and said brake friction material; and
   wherein upon said shaft of said motor ceasing to rotate, said elastic means urging said moving brake section and said brake friction material to move axially toward said brake mating surface until said brake friction material is in contact therewith.

2. The brake of claim 1, wherein said output torque transmitting means comprises one of a gear, a pulley, or a sprocket.

3. The brake of claim 1, wherein said elastic means comprises a spring.

4. The brake of claim 1, wherein said brake mating surface comprises a face of the motor.

5. The brake of claim 1, wherein said brake mating surface comprises a plate located adjacent the motor.

6. The brake of claim 1, wherein said bearing carrier is mechanically connected to said shaft of the motor by one of set screws, a splined shaft, or a key and matching keyway.

7. A self-energized brake for a motor, the self-energizing brake comprising:
   a bearing carrier arranged to be mechanically connected to a shaft of the motor, said bearing carrier including at least two bearings, each bearing having an axis of rotation perpendicular to an axis of rotation of said bearing carrier;
   a moving brake section located coaxially with said bearing carrier, said moving brake section including a trough having at least two trough portions to respectively contain said at least two bearings, said trough portions each including a bearing ramp and a bearing stop for its respective bearing, and said moving brake section further including a brake friction material located on a portion of a face thereof perpendicular to said axis of rotation of said bearing carrier;
   an output torque transmitting means mechanically connected to said moving brake section;
   a brake mating surface located on said motor and perpendicular to said axis of rotation of said bearing carrier, said brake mating surface initially mating with said brake friction material so as to be in contact therewith upon said shaft of the motor being at rest;
   an elastic means and an elastic means retainer and an elastic means retainer fixing means, said elastic means and said elastic means retainer being located coaxially with said bearing carrier, said elastic means retainer fixing means preventing movement of said elastic means retainer in one axial direction and said elastic means urging said moving brake section in an axial direction toward said brake mating surface; and
   wherein upon said shaft of said motor rotating, said bearing carrier and said at least two bearings rotate until said bearings come in contact with and move up their respective bearing ramps, so as to cause said moving brake section and said brake friction material to move axially away from said brake mating surface, resulting in said brake friction material being spaced apart from said brake mating surface; and
   wherein upon said shaft of said motor further rotating, said bearing carrier and said at least two bearings further rotating until said bearings come up against their respective bearing stops, resulting in a cessation of said axial movement of said moving brake section and said brake friction material; and
   wherein upon said shaft of said motor ceasing to rotate, said elastic means urging said moving brake section and said brake friction material to move axially toward said brake mating surface, causing said at least two bearings to move away from their respective bearing stops and to roll down their respective bearing ramps until said brake friction material is again in contact with said brake mating surface.

8. The brake of claim 7, wherein said output torque transmitting means comprises one of a gear, a pulley, or a sprocket.

9. The brake of claim 7, wherein said elastic means comprises a spring.

10. The brake of claim 9, wherein said elastic means retainer comprises a washer shaped spring retainer.

11. The brake of claim 10, wherein said elastic means retainer fixing means comprises one of a retaining ring or a pin.

12. The brake of claim 7, wherein said brake mating surface comprises a face of the motor.

13. The brake of claim 7, wherein said brake mating surface comprises a plate located adjacent the motor.

14. The brake of claim 7, wherein each of said at least two bearings comprises one of a ball bearing, a roller bearing, and a bushing.

15. The brake of claim 7, wherein each of said trough portions has a major axis extending radially in a direction which is perpendicular to said axis of rotation of said bearing carrier.

16. The brake of claim 15, wherein a width of each of said trough portions increases in a direction away from said axis of rotation of said bearing carrier.

17. The brake of claim 7, wherein said bearing carrier is mechanically connected to said shaft of the motor by one of set screws, a splined shaft, or a key and matching keyway.

* * * * *